US011231923B2

United States Patent
Batra et al.

(10) Patent No.: US 11,231,923 B2
(45) Date of Patent: Jan. 25, 2022

(54) CONFIGURABLE TRANSACTION STATUS INTERFACE

(71) Applicant: salesforce.com, inc., San Francisco, CA (US)

(72) Inventors: Tarundeep Batra, Fremont, CA (US); Lopa Mukherjee, San Mateo, CA (US); Himanshu Kapoor, Bangalore (IN)

(73) Assignee: salesforce.com, Inc., San Francisco, CA (US)

(*) Notice: Subject to any disclaimer, the term of this patent is extended or adjusted under 35 U.S.C. 154(b) by 83 days.

(21) Appl. No.: 16/856,902

(22) Filed: Apr. 23, 2020

(65) Prior Publication Data

US 2020/0341753 A1 Oct. 29, 2020

Related U.S. Application Data

(60) Provisional application No. 62/922,246, filed on Apr. 26, 2019.

(51) Int. Cl.
| | |
|---|---|
| *G06F 9/46* | (2006.01) |
| *H04L 29/08* | (2006.01) |
| *G06Q 20/40* | (2012.01) |
| *G06Q 20/10* | (2012.01) |
| *G06F 16/23* | (2019.01) |
| *G06F 9/30* | (2018.01) |

(Continued)

(52) U.S. Cl.
CPC ............ *G06F 8/71* (2013.01); *G06F 16/2379* (2019.01); *G06Q 20/027* (2013.01)

(58) Field of Classification Search
CPC . H04L 2209/38; H04L 9/3239; H04L 9/0637; G06F 16/2365; G06F 16/2379; G06F 8/71; G06F 16/1865; G06Q 20/027; G06Q 20/042; G06Q 20/10; G06Q 20/1085; G06Q 40/12
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

Puspasari et al., Decision Support System For Improving Electronic Pulse Buyer Services Based Sms Gateway, 7 pages (Year: 2018).*

*Primary Examiner* — Thuy Dao
(74) *Attorney, Agent, or Firm* — Kwan & Olynick LLP

(57) ABSTRACT

In a cloud computing environment, a configurable transaction status interface of an enterprise computing platform enables application developers to customize applications efficiently. The configurable transaction status interface includes a global variable that is populated using a method for implementing a configurable status map that maps a transaction result to the global variable without having to customize the application. The configurable transaction status interface allows third party vendors of transaction gateways to use the configurable status map to map one or more of their gateway-specific transaction results to a generic status defined in the global variable. The vendors manage the configurable status map in their own namespace independently of the application with which they are interfacing.

24 Claims, 10 Drawing Sheets

(51) Int. Cl.
　　*G06F 9/38*　　　(2018.01)
　　*G06F 8/71*　　　(2018.01)
　　*G06Q 20/02*　　(2012.01)

(56) References Cited

U.S. PATENT DOCUMENTS

| | | | |
|---|---|---|---|
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,367,077 | B1 | 4/2002 | Brodersen et al. |
| 6,393,605 | B1 | 5/2002 | Mans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,289,976 | B2 | 10/2007 | Kihneman et al. |
| 7,340,411 | B2 | 3/2008 | Cook |
| 7,620,655 | B2 | 11/2009 | Larsson et al. |
| 9,047,070 | B2 | 6/2015 | Roy-Faderman |
| 10,817,498 | B2 * | 10/2020 | Chalakov ............ G06F 16/2219 |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachadran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2009/0177744 | A1 | 7/2009 | Marlow et al. |
| 2014/0157225 | A1 | 6/2014 | Roy-Faderman |
| 2018/0004778 | A1 | 1/2018 | Roy-Faderman |
| 2019/0026392 | A1 | 1/2019 | Roy-Faderman et al. |

\* cited by examiner

300 – EXAMPLE GENERIC STATUS TYPES FOR A TRANSACTION RUN THROUGH A (PAYMENT) GATEWAY

| Generic Status Type | Definition | Action |
|---|---|---|
| Success | Payment Successful on Gateway | Create payment and allocations |
| Decline | Insufficient Funds | Do not create payment records |
| Permanent/Fail | Hard decline, ex fraud/card invalid | Do not create payment records |
| Review | Approval needed | Do not create payment records |
| Indeterminate | Bank response timeout, etc. | Do not create payment records. Set the Hold flag on invoice. |
| System Issue | Cannot reach Gateway, runtime exception | Do not create payment records |
| Validation Error | ABA error | Do not create payment records |

Fig.3

400 – EXAMPLE MAPS OF TRANSACTION (PAYMENT) GATEWAY RESPONSE CODE TO GENERIC STATUS TYPES

| Gateway Status | Gateway | Response Code | Description/Action |
|---|---|---|---|
| Success | Cybersource | 100 | Successful transaction |
| Permanent/Fail | Cybersource | 101 | Missing required fields identified, resend transaction with complete information |
| Permanent/Fail | Cybersource | 102 | Invalid data |
| Review | Cybersource | 110 | Partial amount approved, review supported processors and payment methods. |

Fig.4A

| Gateway Status | Gateway | Response Code | Description/Action |
|---|---|---|---|
| Permanent/Fail | Payeezy | 100 | Timed out. |
| Decline | Payeezy | 101 | Fraud detected |
| Success | Payeezy | 102 | Successful |
| Review | Payeezy | 110 | Value to large for automatic approval |

Fig.4B

600A - EXAMPLE APPLICATION: DEFINE GLOBAL VARIABLE AND
EXPOSE AN INTERFACE METHOD FOR A
TRANSACTION GATEWAY TO PROVIDE GATEWAY STATUS

```
global Enum GatewayStatusType { Success, Decline,
PermanentFail, Review, Indeterminate, SystemIssue
ValidationError } public GatewayStatusType gatewayStatus;

global interface TransactionGateWayStatus { void
populateGatewayStatus(TransactionResult
transactionResult); }
```

Fig.6A.

600B - EXAMPLE TRANSACTION GATEWAY: DEFINE CUSTOM METADATA TYPES
FOR GATEWAY STATUS MAPPER

```
<CustomMetadata xmlns="http://soap.sforce.com/
....metadata" xmlns:xsi="http://www.w3.org/...

<label>100</label> /* code to map "100" to "Success"

<values>
        <field>ResponseCode__c</field>
        <value xsi:type="xsd:string">100</value>
    </values>

<values>
        <field>GatewayStatus__c</field>
        <value xsi:type="xsd:string">Success</value>
    <values>

<label>101</label> code to map "101" to "Fail"

...
</CustomMetadata>
```

Fig.6B.

600C – EXAMPLE TRANSACTION GATEWAY:
EXAMPLE IMPLEMENTATION OF POPULATE GATEWAY STATUS METHOD
USING THE GATEWAY STATUS MAPPER DEFINED BY CUSTOM METADATA TYPES

```
public void
populateGatewayStatus(blng.TransactionResult.
transactionResult) { blng.TransactionResult.GatewayStatusType
   gatewayStatus = defaultGatewayStatus;

String returnCode =
   TransactionResult.getResponseCode();

if (returnCode != null) {
     List<GatewayStatusMapping__mdt> gatewayStatusMaps =
     [
         SELECT GatewayStatus__c
         FROM GatewayStatusMapping__mdt
         WHERE ResponseCode__c = :returnCode
         LIMIT 1
     ];

if (!gatewayStatusMaps.isEmpty()) { gatewayStatus =
         mapGatewayStatusEnumTypesByStrings.get
           (gatewayStatusMaps.get(0.GatewayStatus__c);

if (gatewayStatus == null) {
            gatewayStatus = defaultGatewayStatus;
         }
     }
   } transactionResult.setGatewayStatus(gatewayStatus);

CONFIGURABLE TRANSACTION STATUS INTERFACE

RELATED CASES

This application claims the benefit of U.S. Provisional Application No. 62/922,246, entitled, "CONFIGURABLE TRANSACTION STATUS INTERFACE", filed Apr. 26, 2019, which is incorporated by reference in its entirety.

TECHNICAL FIELD

Embodiments of the invention relate generally to the field of software development, and more particularly, to developing configurable software.

BACKGROUND

Modern software for enterprise computing is often provided as a service in a scalable, on-demand cloud computing environment, commonly referred to as software as a service (SaaS) hosted on a platform as a service (PaaS). Rather than developing custom software from scratch for each customer, application developers customize the generic functionality provided in enterprise application products for operation on a shared enterprise computing platform. The customizable enterprise application products provide generic functionality for customer relationship management, supply chain management, accounting, marketing, retail and numerous other business and operational needs. Developers often configure services provided by third-party vendors to deliver custom functionality to different customers. This can be challenging since the number of third-party vendors of services is often quite large, especially for services such as financial transaction services, also referred to as payment gateways.

BRIEF DESCRIPTION OF THE DRAWINGS

The included drawings, by way of example only and not limitation, illustrate possible structures and operations for implementing the disclosed inventive systems, apparatus, methods, and computer-readable storage media. The drawings do not limit any changes in form and detail that may be made by one skilled in the art consistent with the spirit and scope of the disclosed implementations.

FIG. 3 illustrates example generic status types for a configurable transaction status interface of an enterprise computing platform according to one embodiment;

FIGS. 4A-4B illustrate exemplary maps of generic status types for a configurable transaction status interface of an enterprise computing platform according to one embodiment;

FIGS. 6A-6C illustrate example implementations of code for a configurable transaction status interface of an enterprise computing platform according to one embodiment;

DETAILED DESCRIPTION

Figure 1:
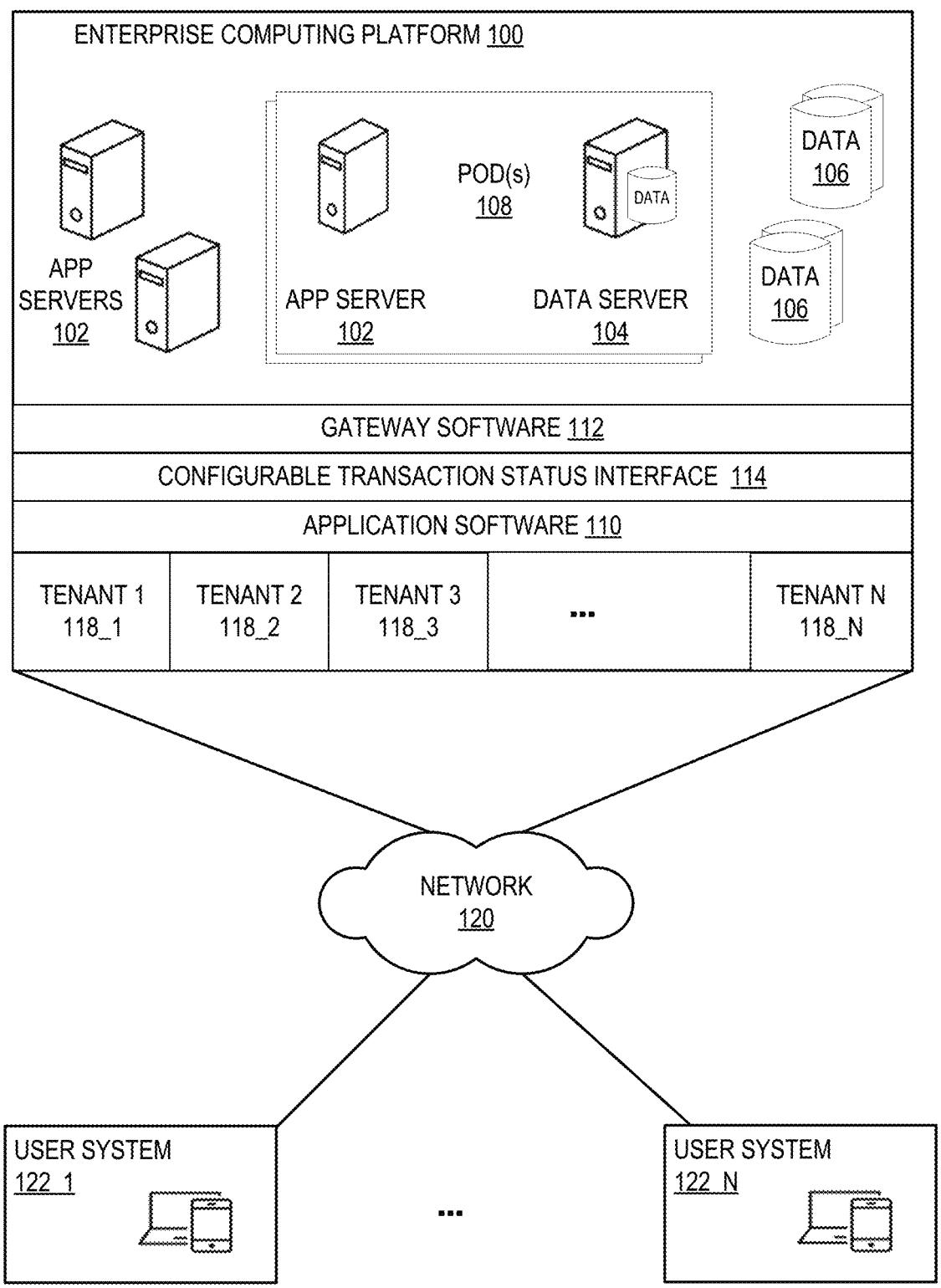
FIG. 1 is a block diagram overview of a system for a configurable transaction status interface of an enterprise computing platform according to one embodiment.

Because modern software applications are often developed using generic functionality it can be challenging to ensure that they interoperate correctly with the specialized services provided by third-party vendors.

For example, one of the common specialized services provided by third-party vendors is a payment gateway for financial transactions. Currently, there are more than 9000 different payment gateway vendors capable of providing financial transaction services to software applications operating on an enterprise computing platform. Each vendor typically uses their own coding schemes for categorizing payment transaction results even if those results are the same as or similar to another vendor's transaction results. For example, vendor "A" providing gateway "A" might code a transaction result for a successful payment as "100" and a transaction result for a failed payment transaction as "200, whereas vendor "B" providing gateway "B" might code a transaction result for a successful payment transaction as "AA" and a transaction result for a failed payment transaction as "XX."

In contrast to the non-uniform transaction results coding schemes employed by gateways, the generic functionality provided by an application that uses the gateways typically requires a generic status code for common payment transaction results to take the appropriate action, e.g., completing or declining a purchase, granting or providing access to web content, and so forth. Reconciling all possible transaction result coding schemes used by gateways supported in an enterprise computing platform presents a significant challenge to developers responsible for customizing applications for execution in an enterprise computing platform.

One conventional solution is for the application developer to create a custom object that reconciles all possible transaction results from different gateways for each transaction. While this approach accommodates the differences between the gateways, it can require creating custom objects that store the vendor's gateway-specific data in addition to the usual customer data. In an enterprise computing platform serving multiple tenants this can be problematic since application objects in applications should be used to store customer data, not gateway-specific data for reconciling the different transaction results from payment gateways.

Other disadvantages to creating custom objects include the need for the application to: make additional database callouts for every transaction to retrieve the gateway-specific information for reconciling transaction results; implement caching of the retrieved data in the application code; and for the developer to generate a post-install script to set up a customized mapping that the application can use to reconcile the gateway-specific transaction result coding scheme to the generic status codes used by the application. Other issues can arise as well, including the risk that the custom object will reconcile transaction results incorrectly based on incorrect or outdated gateway-specific information about the transaction results coding schemes currently in use.

Another example of a conventional approach is for developers to create hardcoded logic when building SaaS applications to reconcile transaction results from different gateways (e.g., creating hardcoded logic in Apex code in the Salesforce.com platform). This eliminates the need to retrieve gateway-specific information during execution for reconciling transaction result coding schemes to generic status codes. Hardcoded logic also eliminates the need to generate the post-install script to set up the customized mapping. In addition, hardcoded logic prevents customers from introducing errors in processing their transactions. Despite these advantages, using hardcoded logic also has several drawbacks.

For example, using hardcoded logic to build the SaaS application does not allow for dynamic runtime changes. It also imposes the same mapping of transaction results coding schemes to generic transaction statuses for all customers, even those that don't need it. Moreover, every new transaction result coding scheme requires the application developer to add to or change the hardcoded logic to reconcile transaction results coding schemes from different gateways and repackage and version the new code. Such an approach also prevents administrators from updating transaction result coding schemes and associated mapping changes to the generic transaction status used in the application.

To address the challenges of building a customized application that can interpret non-uniform transaction results from potentially thousands of transaction gateways and take appropriate actions, embodiments of a configurable transaction status interface enables the gateway vendors to map their transaction results coding schemes to a uniform generic status code defined by the application developer when building the application. This simplifies the development and deployment of the application to the enterprise computing platform while still allowing the application to use all payment gateways efficiently and without risking invalid transaction results for customers. Since the gateway vendors know best how to map their non-uniform transaction results to the uniform generic status defined in an application, the task of mapping is appropriately the responsibility of the gateway vendors. The gateway vendors can, in turn, dynamically update the mapping of their transaction results coding schemes to the uniform generic status codes defined in the application whenever the need arises and without impacting the deployment of the application to the enterprise computing platform.

FIG. 1 illustrates an example enterprise computing platform 100 in which embodiments of a configurable transaction status interface can be implemented. Enterprise computing platform 100 can include various application servers 102 and databases 106 connected via a network. During operation of enterprise computing platform 100, different combinations of application servers 102 and data servers 104 can execute various types of application software 110 and access data stored in databases 106.

User systems 122_1 to 122_N typically connect to application servers 102, data server 104 and databases 106 through a network 120. Network 120 includes internal networks (not shown), local area networks (LANs), wide area networks (WANs), privately or publicly switched telephone networks (PSTNs), wireless (Wi-Fi) networks, cellular or mobile telecommunications networks, and any other similar networks, or any combination thereof. Enterprise computing platform 100 and user systems 122_1 to 122_N can operate within a private enterprise network, within a publicly accessible web-based network, such as via the Internet, or within any combination of networks.

User systems 122_1 to 122_N can include personal computers (PCs), including workstations, laptop or notebook computers, tablet computers, handheld computing devices, cellular or mobile phones, smartphones, terminals, or any other device capable of accessing network 120 and enterprise computing platform 100. User systems 122_1 to 122_N can use different protocols to communicate with enterprise computing platform 100 over network 120, such as Transmission Control Protocol and Internet Protocol (TCP/IP), Hypertext Transfer Protocol (HTTP), and/or File Transfer Protocol (FTP), to name a few non-limiting examples. In one example, user systems 122_1 to 122_N can operate web browsers or applications that can send and receive HTTP messages to and from an HTTP server operating in enterprise computing platform 100.

Enterprise computing platform 100 in conjunction with application software 110 can provide an almost limitless variety of different services, such as providing software as a service (SaaS), platform as a service (PaaS), customer relationship management (CRM), enterprise resource planning (ERP), file sharing, web-based commerce or e-commerce, social networking, cloud-based computing and/or storage, any other similar service, or any combination thereof. Enterprise computing platform 100 and/or network 120 can be alternatively referred to as a cluster, cloud, and/or cloud-based computing system.

In one embodiment, application software 110 can interoperate with third-party software to provide additional services, such as a vendor's transaction gateway software 112. By way of example only and not limitation, the transaction gateway software 112 can include a payment gateway that processes financial transactions in accordance with rules established by the third-party software vendor. For example, the transaction gateway software 112 can include software for thousands of different payment gateways for different payment services providers, each of which can process financial transactions for user systems 122_1 to 122_N in accordance with gateway-specific requirements. As will be described in further detail in FIGS. 2-8, application software 110 can interoperate with the third-party transaction gateway software 112 in accordance with embodiments of a configurable transaction status interface 114 implemented on the enterprise computing platform 100.

In one example, enterprise computing platform 100 and application software 110 can operate as a multi-tenant system (MTS). A multi-tenant system refers to a database system where different hardware and software can be shared by one or more organizations represented as tenants (118_1, 118_2, 118_3, . . . 118_N; collectively "tenants 118"). For example, enterprise computing platform 100 can associate a first tenant 118_1 with an organization that sells airline services, associate a second tenant 118_2 with an organization that sells widgets, and associate a third tenant 118_3 with an organization that sells medical administration services. The multi-tenant system can effectively operate as multiple virtual databases each associated with one of tenants 118.

A pod 108 can include groups of application servers 102, data servers 104 and associated databases 106 that share an instance of the multi-tenant system. Different pods (other pods similar to pod 108, not shown) can operate independently but can share some processing and infrastructure equipment, such as routers (not shown) and storage area networks (SANs) (not shown). For example, tenants 118_2 and 118_3 can operate within pod 108 and a user associated with tenant 118_3 can use user system 122_1 to access the multi-tenant system operating in pod 108.

In one embodiment, user system 122_1 can send requests from the user to a load balancer (not shown) in pod 108. In response, the load balancer can forward the requests to one of application servers 102 within pod 108. Application server 102 can service the requests by executing application software 110 within pod 108, including processing requests that involve transactions through third-party transaction gateway software 112 using the configurable transaction status interface 114 and/or accessing data servers 104 serving data from databases 106 within pod 108 or from elsewhere as needed.

Enterprise computing platform 100 can include, for example, hundreds of pods like pod 108, and a database administrator can assign thousands of tenants 118 to the same pod 108, in an example embodiment. The database administrator can add new pods 108 for servicing additional tenants 118 and/or can reassign any of tenants 118 to different pods. For example, one of tenants 118 can use a relatively large amount of processing bandwidth and/or use a relatively large amount of storage space. The database administrator can reassign that tenant, e.g., 118_2, to a different pod 108 with more processing bandwidth and/or storage capacity than the originally assigned pod. Thus, the multi-tenant system can scale for practically any number of tenants and users.

Figure 2:
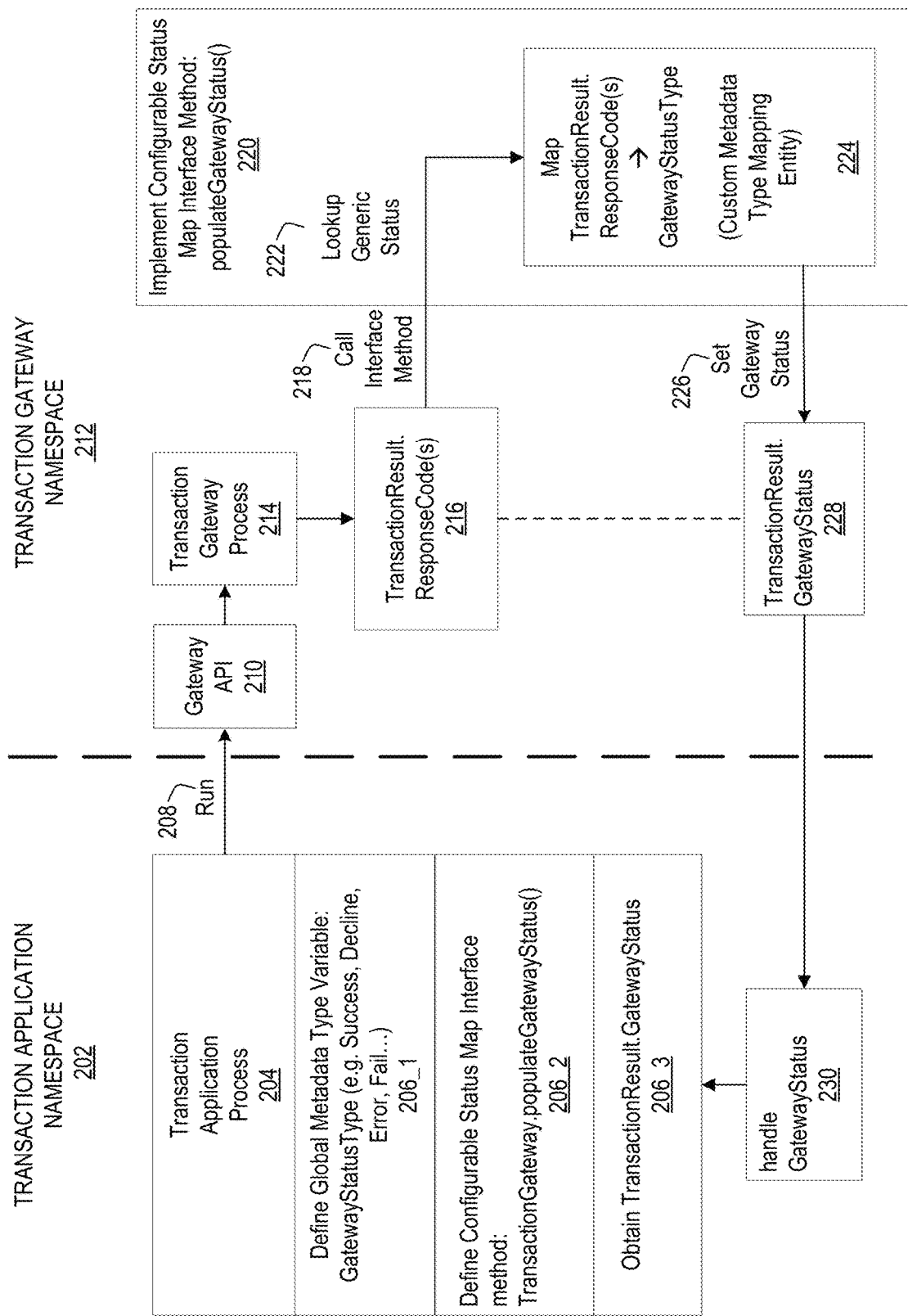
FIG. 2 is a block diagram of additional details of a configurable transaction status interface of an enterprise computing platform according to one embodiment.

FIG. 2 illustrates additional details of the configurable transaction status interface 114 described in FIG. 1. In one embodiment, an application that processes transactions operates in a transaction application namespace 202 of the enterprise computing platform. A transaction gateway operates in a transaction gateway namespace 212 separate from the application namespace 202. Both the transaction application namespace 202 and the transaction gateway namespace 212 operate on the enterprise computing platform 100 described in FIG. 1. Although only one transaction gateway namespace 212 is shown, each vendor's transaction gateway has a separate namespace. Thus, several transaction gateway namespaces 212 can co-exist in relation to any given application namespace 202. Conversely, several application namespaces 202 can co-exist in relation to any given transaction gateway namespace 212. In other words, an application can use several different gateways and a gateway can provide gateway services to several different applications.

Each namespace comprises a collection of objects. Objects can refer to entities such as users, customers, tenants, gateways, accounts, contacts, leads, opportunities, reports, cases, files, documents, orders, price books, products, solutions, forecasts, or any other definable category. Objects also may refer to instances of the entities such as the data for the individual users, customers, tenants, gateways, accounts, contacts, leads, opportunities, reports, cases, etc. Objects can also refer to tables that include fields or a schema describing the entities. For example, a table may define fields for the transaction results coding schemes used in the different transaction gateway namespaces and for the corresponding generic status codes used in an application namespace. Objects can also refer to records that contain data or instances for the entities and fields. For example, a record can contain the gateway-specific transaction result coding schemes for particular transaction result outcomes. A record can also contain a customer's transaction data for a particular transaction. A record can also contain an application's generic status codes used to process a customer's transactions.

In one embodiment, a transaction application process 204 operating in the application namespace 202 runs a transaction 208 via a gateway application programming interface (API) 210 through a transaction gateway process 214 operating in the transaction gateway namespace 212. The transaction application process 204 includes logic 206_1 to define a global metadata type object variable. By way of example only and not limitation, the global metadata type object variable is named "GatewayStatusType" and defines uniform generic status types of "Success," "Decline," "Error," "Fail," . . . and so forth, appropriate for the type of transaction gateway, in this example a payment gateway. In some embodiments, other types of transaction gateways and uniform generic status types can be used.

In one embodiment, the transaction application process 204 further includes logic 206_2 to define a configurable status map interface method. By way of example only and not limitation, the configurable status map interface method is defined as a method named populateGatewayStatus of an object named TransactionGateway. This object and associated method are referenced in the transaction application process 204 in logic 206_3 to obtain the uniform generic status of a transaction regardless of which vendor's transaction gateway process 214 was used. The uniform generic status is populated by the transaction gateway process 214 in the transaction gateway namespace 212 in the GatewayStatus property of an object named TransactionResult (as further described with reference to 216 and 228 below).

In one embodiment, the transaction gateway process 214 processes the transaction in accordance with the transaction gateway's requirements and stores one or more result codes as part of an object for storing the transaction result. By way of example only and not limitation the object for storing the transaction result in the transaction gateway namespace 212 is TransactionResult object 216/228/206_3, and the transaction result can be stored, for example, as one or more gateway-specific codes in a ResponseCode property 216 of the TransactionResult object.

As shown, a call 218 to a configurable status map interface 220 is issued in the transaction gateway namespace 212. The configurable status map interface 220 includes the method that was defined in logic 206_2 in the transaction application namespace 202, e.g. the TransactionGateway.populateGatewayStatus method. The method performs a lookup generic status 222 in the transaction gateway namespace 212 on a map 224 of the TransactionResult.ResponseCode(s) 216 to one of the configurable generic statuses of the GatewayStatusType. The map 224, defined in the transaction gateway namespace 212, maps the gateway-specific transaction results to the global metadata type variable values defined in the transaction application namespace 202 (at logic 206_1) for the GatewayStatusType. In one embodiment, should a gateway-specific transaction result be absent from the map, one of the global metadata type variable values will function as the default status, e.g., "Error" or "Fail."

In one embodiment the lookup 222, map 224 and GatewayStatusType at logic 206_1 is implemented as a custom metadata type mapping such as provided in the Custom Metadata Type feature of the Salesforce enterprise PaaS, e.g. the "Lightning Platform." The Custom Metadata Type feature allows application developers to define a type of customizable, deployable, packageable, and upgradeable application metadata. The application metadata is customizable with reusable functionality to populate the value of the application metadata during execution of the application.

Here, by way of example only and not limitation, the application metadata is the GatewayStatusType global metadata type variable that contains the configurable generic status types. The populateGatewayStatus method included in the configurable status map interface 220, is the reusable functionality that populates a gateway status for a transaction using the configurable generic status types. For example, in one embodiment, the transaction gateway process 214 concludes by performing a set gateway status 226 to set the GatewayStatus property of the TransactionResult object 228 to the GatewayStatusType returned by the lookup 222 on map 224. For example, if the GatewayStatusType returned by the lookup 222 on map 224 is "Success," then the GatewayStatus property is set to "Success."

In one embodiment, in the transaction application namespace 202, the GatewayStatus property is retrieved via handleGatewayStatus 230 to complete the populateGatewayStatus method performed in the transaction gateway namespace 212.

In one embodiment, the above-described architecture used to implement the configurable status map interface 114 allows each of the many thousands of transaction gateways self-maintain their transaction coding schemes as they see fit without constraints on other vendors and/or the users/customers. Since each namespace differentiates the named objects between tenants, customers and gateways, customized processing of transactions can occur without unnecessarily constraining other users of the enterprise computing platform 100. This architecture achieves the desired customization without requiring the application developer to create and maintain specialized code beyond defining the application metadata in the GatewayStatusType global metadata type variable with the configurable generic status types that the vendor's transaction gateways need to conform to (e.g., "Success," "Fail,", etc.), and ensuring that the GatewayStatus property of the TransactionResult object is capable of being populated by the individual vendor gateways. In turn, the individual vendor gateways implement a method in the transaction gateway namespace 212 to populate the GatewayStatus property of a TransactionResult object by performing the mapping logic in embodied in a gateway status mapper (e.g., a Custom Metadata Type mapping entity) to map the gateway-specific transaction results to the generic status used in the application namespace 202.

Among other advantages, the individual vendor gateways can design their own mapper to use multiple transaction response codes, Boolean logic, and so forth, to ensure that their transaction results are correctly mapped to the generic status used in the application namespace 202. Any problems can be resolved directly between customers and gateways without involving the application.

FIG. 3 illustrates an example 300 of generic status types 302, their corresponding definitions 304 and actions taken 306 by the transaction application process 204 upon completion of the populateGatewayStatus method in the transaction gateway namespace 212 as described in FIG. 2. For example, the generic status type 302 includes seven uniform status types, "Success," "Decline," "Permanent/Fail," "Review," "Indeterminate," "System Issue," and "Validation Error." In some embodiments, other generic status types, corresponding definitions and actions taken can be used. In one embodiment, the generic status types 302 are defined as application metadata as in the example described with reference to FIG. 7A.

FIGS. 4A-4B illustrate example maps of the non-uniform transaction gateway response codes to the uniform generic status types. For example, for the Cybersource vendor of a payment gateway in FIG. 4A, the response code of 100 is described as a successful transaction and is mapped to the "Success" gateway status. In contrast, for the Payeezy vendor of a payment gateway in FIG. 4B, the same response code of 100 is described as a timed-out response and is mapped to the "Permanent/Fail" gateway status. In one embodiment, the maps are defined in a gateway status mapper entity as in the example described with reference to FIG. 7B and the logic for performing the method to populate the gateway status for a particular transaction result is illustrated in the example described with reference to FIG. 7C.

Figure 5:
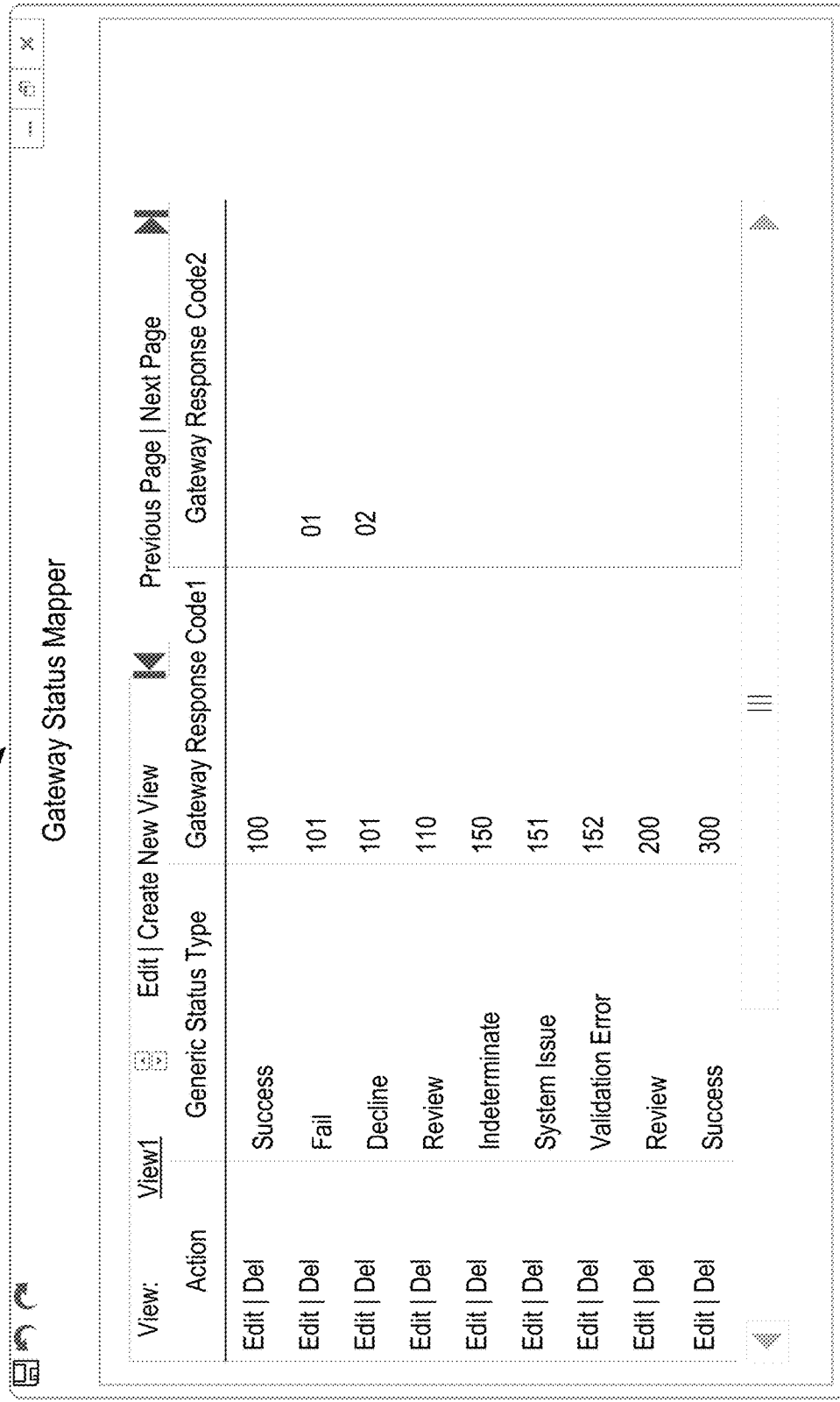
FIG. 5 illustrates an exemplary user interface for maps of generic status types for a configurable transaction status interface of an enterprise computing platform according to one embodiment.

FIG. 5 illustrates an example interface that an administrator of a vendor can use to create and edit the map of the non-uniform transaction result response codes generated in the transaction gateway namespace 212 to the uniform generic status types defined by the transaction application and used in the transaction application namespace 202. By way of example only and not limitation, a "GatewayStatusMapper" interface 500 presents a browser-based navigable user interface (UI) for an administrator to define one or more transaction results coded as gateway response codes, e.g. Code1 and Code2, to map to one of the generic status types used in the transaction application namespace 202.

In one embodiment, the "GatewayStatusMapper" interface 500 is pre-populated with the generic status types used in the transaction application namespace 202 and the administrator edits in the Code1 and Code2 response code values to reflect the current requirements of the vendor of the gateway. In this example, a Code1 gateway response code value of 100 for a transaction result maps to a generic status type of "Success," and a combination of a Code 1 gateway response code value of 101 and a Code 2 gateway response code value of 01 for a transaction result maps to a generic status type of "Fail." Other response code(s) can be mapped to a generic status type.

In one embodiment, the "GatewayStatusMapper" interface 500 is used to dynamically update the gateway metadata embodied in the map 224 used for performing the lookup generic status gateway 222 in the transaction gateway namespace 212. In this manner the vendor of the transaction gateway can control the mapping of their non-uniform transaction results/response codes (e.g. the custom metadata) used in the transaction gateway namespace 212 to the uniform generic status types (e.g. the application metadata) used in the transaction application namespace 202.

FIGS. 6A-6C illustrate example implementations of logic for a configurable transaction status interface of an enterprise computing platform according to one embodiment. In FIG. 6A, an example logic 600A defines a global variable and exposes an interface method for a transaction gateway to provide a gateway status for a transaction. By way of example only, and not limitation, application metadata is defined for a global variable named "GatewayStatusType," including application metadata for the generic status types of "Success," "Decline," "PermanentFail," "Review," "Indeterminate," "SystemIssue," and "ValidationError." A global interface TransactionGatewayStatus is defined to expose the populateGatewayStatus method for populating the generic status based on mapping the gateway-specific transaction result in one of the transaction gateway namespaces to the generic status.

In FIG. 6B, an example logic 600B defines custom metadata types to map each of the gateway's transaction results to one of the generic statuses, referred to as a gateway status mapper. In the illustrated example, a transactionResult value represented by a gateway-specific response code of "100" is mapped to a generic status of "Success," and a gateway-specific response code of "200" is mapped to a generic status of "Fail."

In FIG. 6C, an example logic 600C implements a method to populate the generic status based on the map defined by the custom metadata types in the logic illustrated in FIG. 6B. By way of example only and not limitation, the method populateGatewayStatus populates the gatewayStatus property of the transactionResult object based on performing the lookup against the map using the current transactionResult value. Populating includes setting the transactionResult object's corresponding gatewayStatus property with the GatewayStatus mapped to the current transactionResult value. In one embodiment, the method populateGatewayStatus populates the gatewayStatus property of the transactionResult object based on performing the lookup against the map using two or more current transactionResult values (not shown).

Figure 7A:
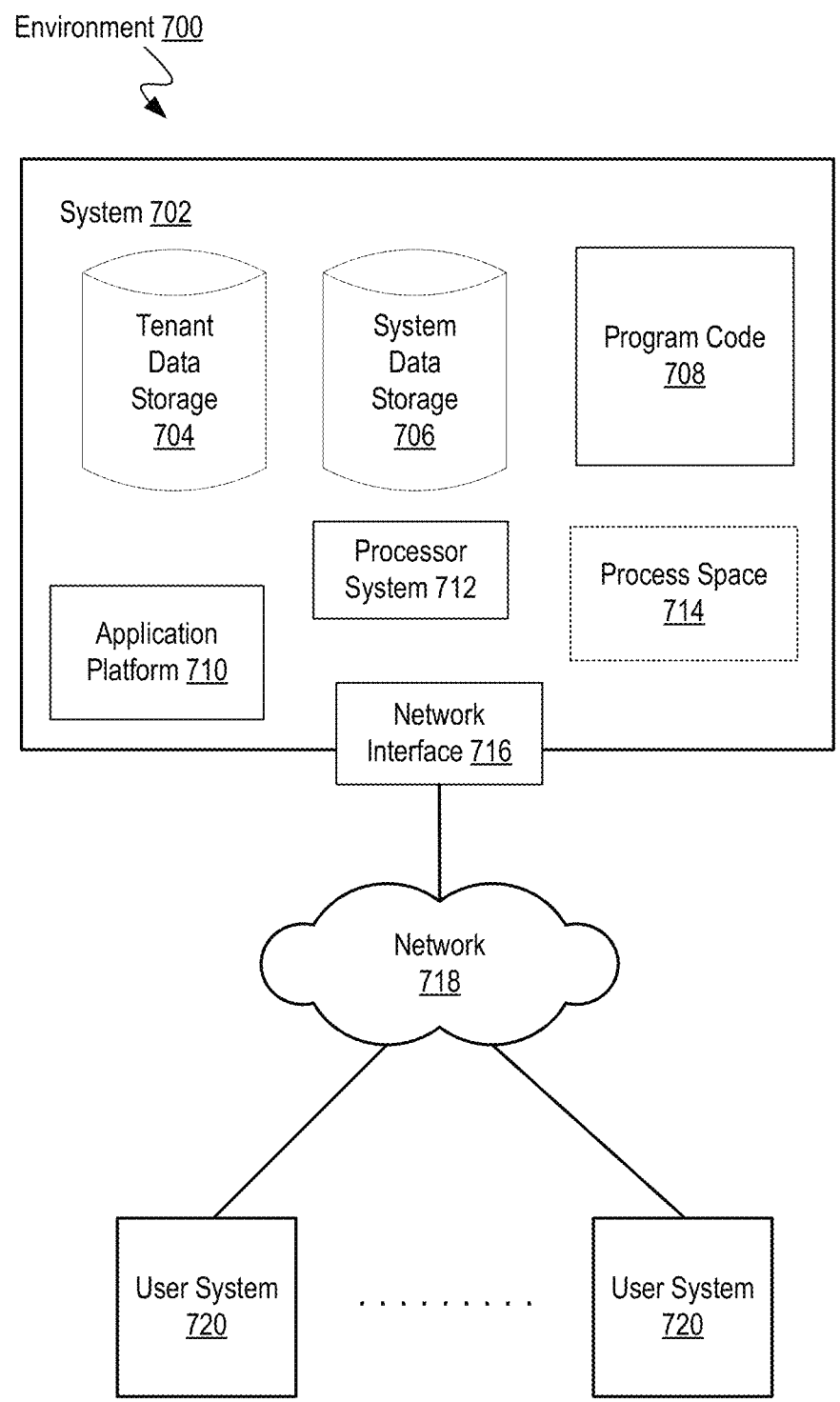
FIGS. 7A-7B are block diagrams illustrating an overview of a cloud computing environment within which one or more implementations of a configurable transaction status interface of an enterprise computing platform can be carried out.

FIG. 7A illustrates a block diagram of an environment 700 in which an on-demand database service that supports a configurable transaction status interface can be implemented in accordance with the described embodiments. Environment 700 may include user systems 720, network 718, system 702, processor system 712, application platform 710, network interface 716, tenant data storage 704, system data storage 706, program code 708, and process space 714. In other embodiments, environment 700 may not have all the components listed and/or may have other elements instead of, or in addition to, those listed above.

Environment 700 is an environment in which an on-demand database service exists. User system 720 may be any machine or system that is used by a user to access a database user system. For example, any of user systems 720 can be a handheld computing device, a mobile phone, a laptop computer, a work station, and/or a network of computing devices. As illustrated in FIG. 7A (and in more detail in FIG. 7B) user systems 720 might interact via a network 718 with an on-demand database service, which is system 702.

An on-demand database service, such as system 702, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 702" and "system 702" is used interchangeably herein. A database image may include one or more database objects. A relational database management system (RDMS) or the equivalent may execute storage and retrieval of information against the database object(s). Application platform 710 may be a framework that allows the applications of system 702 to run, such as the hardware and/or software, e.g., the operating system. In an embodiment, on-demand database service 702 may include an application platform 710 that enables creation, managing and executing one or more applications developed by the provider of the on-demand database service, users accessing the on-demand database service via user systems 720, or third party application developers accessing the on-demand database service via user systems 720.

The users of user systems 720 may differ in their respective capacities, and the capacity of a user system 720 might be entirely determined by permissions (permission levels) for the current user. For example, where a salesperson is using a user system 720 to interact with system 702, that user system has the capacities allotted to that salesperson. However, while an administrator is using that user system to interact with system 702, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 718 is any network or combination of networks of devices that communicate with one another. For example, network 718 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 720 might communicate with system 702 using TCP/IP and, at a higher network level, use other common Internet protocols to communicate, such as HTTP, FTP, AFS, WAP, etc. In an example where HTTP is used, user system 720 might include an HTTP client commonly referred to as a "browser" for sending and receiving HTTP messages to and from an HTTP server at system 702. Such an HTTP server might be implemented as the sole network interface between system 702 and network 718, but other techniques might be used as well or instead. In some implementations, the interface between system 702 and network 718 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 702, shown in FIG. 7A, implements a web-based customer relationship management (CRM) system. For example, in one embodiment, system 702 includes application servers configured to implement and execute CRM software applications as well as provide related data, code, forms, webpages and other information to and from user systems 720 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 702 implements applications other than, or in addition to, a CRM application. For example, system 702 may provide tenant access to multiple hosted (standard and custom) applications, including a CRM application. User (or third-party developer) applications, which may or may not include CRM, may be supported by the application platform 710, which manages creation, storage of the applications into one or more database objects and executing of the applications in a virtual machine in the process space of the system 702.

One arrangement for elements of system 702 is shown in FIG. 7A, including a network interface 716, application platform 710, tenant data storage 704 for tenant data 705, system data storage 706 for system data 707 accessible to system 702 and possibly multiple tenants, program code 708 for implementing various functions of system 702, and a process space 714 for executing MTS system processes and tenant-specific processes, such as running applications as part of an application hosting service. Additional processes that may execute on system 702 include database indexing processes.

Several elements in the system shown in FIG. 7A include conventional, well-known elements that are explained only briefly here. For example, each user system 720 may include a desktop personal computer, workstation, laptop, PDA, cell phone, or any wireless access protocol (WAP) enabled device or any other computing device capable of interfacing directly or indirectly to the Internet or other network connection. User system 720 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 720 to access, process and view information, pages and applications available to it from system 702 over network 718. Each user system 720 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 702 or other systems or servers. For example, the user interface device can be used to access data and applications hosted by system 702, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 720 and all its components are operator configurable using applications, such as a browser, including computer code run using a central processing unit such as an Intel Pentium® processor or the like. Similarly, system 702 (and additional instances of an MTS, where more than one is present) and all of their components might be operator configurable using application(s) including computer code to run using a central processing unit such as processor system 712, which may include an Intel Pentium® processor or the like, and/or multiple processor units.

According to one embodiment, each system 702 is configured to provide webpages, forms, applications, data and media content to user (client) systems 720 to support the access by user systems 720 as tenants of system 702. As such, system 702 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
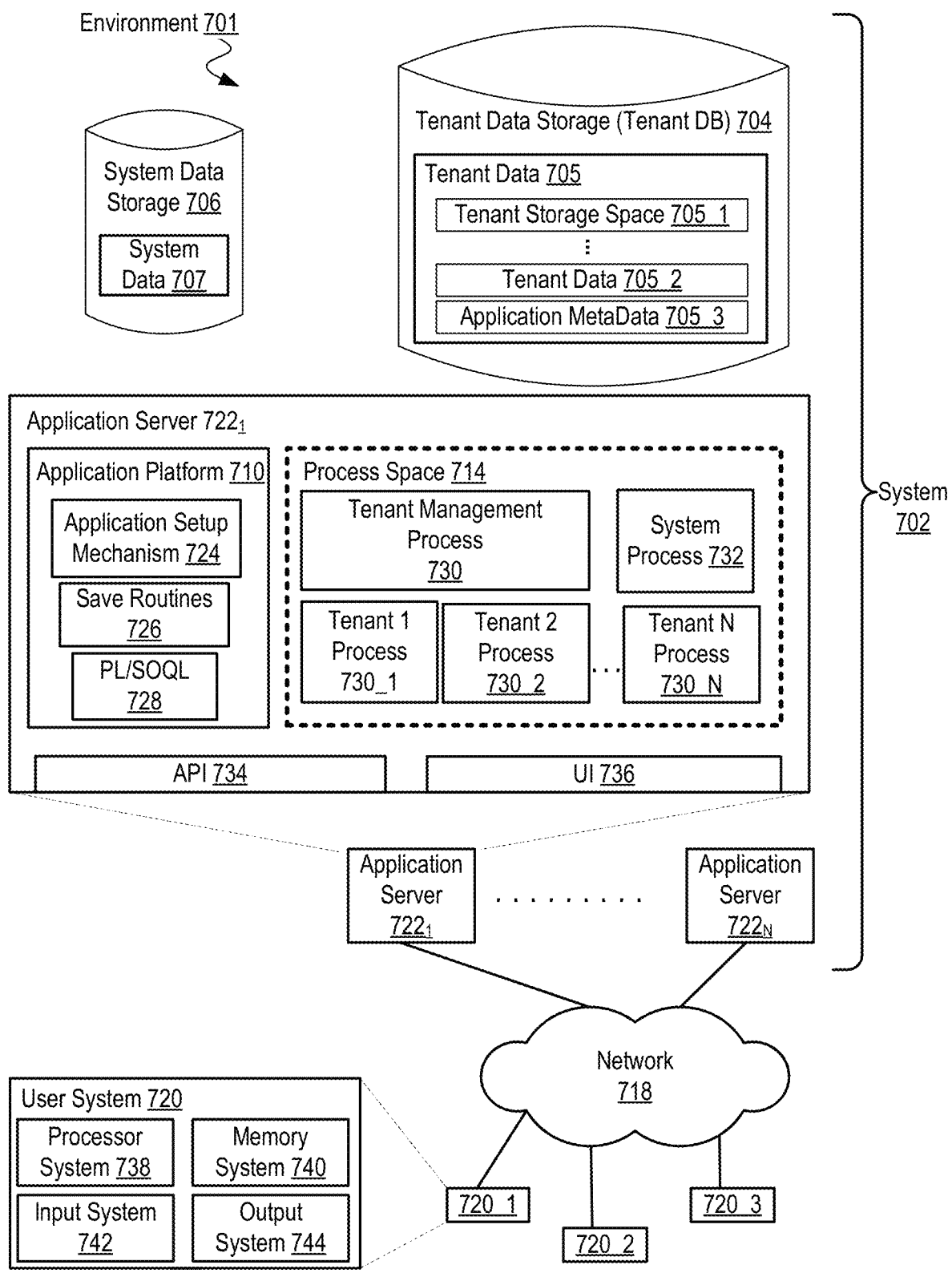

FIG. 7B illustrates another block diagram of an embodiment of elements of FIG. 7A and various possible interconnections between such elements in accordance with the described embodiments. FIG. 7B also illustrates environment 701. However, in FIG. 7B, the elements of system 702 and various interconnections in an embodiment are illustrated in further detail. More particularly, FIG. 7B shows that user system 720 may include a processor system 738, memory system 740, input system 742, and output system 744. FIG. 7B shows network 718 and system 702. FIG. 7B also shows that system 702 may include tenant data storage 704, having therein tenant data 705, which includes, for example, tenant storage space 705_1, tenant data 705_2, and application metadata 705_3. System data storage 706 is depicted as having therein system data 707. Further depicted within the expanded detail of application servers $722_{1-N}$ are User Interface (UI) 736, Application Program Interface (API) 734, application platform 710 includes PL/SOQL 728, save routines 726, application setup mechanism 724, process space 714 includes system process space 732, tenant 1-N process spaces 730_1, and tenant management process space 730. In other embodiments, environment 701 may not have the same elements as those listed above and/or may have other elements instead of, or in addition to, those listed above.

User system 720, network 718, system 702, tenant data storage 704, and system data storage 706 were discussed above in FIG. 7A. As shown by FIG. 7B, system 702 may include a network interface 716 (of FIG. 7A) implemented as a set of HTTP application servers 722, an application platform 710, tenant data storage 704, and system data storage 706. Also shown is system process space 732, including individual tenant process spaces 730_1 and a tenant management process space 730. Each application server 722 may be configured to tenant data storage 704 and the tenant data 705 therein, and system data storage 706 and the system data 707 therein to serve requests of user systems 720. The tenant data 705 might be divided into individual tenant storage areas (e.g., tenant storage space 705_1), which can be either a physical arrangement and/or a logical arrangement of data. Within each tenant storage space 705_1, tenant data 705_2, and application metadata 705_3 might be similarly allocated for each user. For example, a copy of a user's most recently used (MRU) items might be stored to tenant data 705_2. Similarly, a copy of MRU items for an entire organization that is a tenant might be stored to tenant storage space 705_1. A UI 736 provides a user interface and an API 734 provides an application programmer interface into system 702 resident processes to users and/or developers at user systems 720. The tenant data and the system data may be stored in various databases, such as one or more Oracle™ databases.

Application platform 710 includes an application setup mechanism 724 that supports application developers' creation and management of applications, which may be saved as metadata into tenant data storage 704 by save routines 726 for execution by subscribers as one or more tenant process spaces 730_1 managed by tenant management process space 730 for example. Invocations to such applications may be coded using PL/SOQL 728 that provides a programming language style interface extension to API 734. Invocations to applications may be detected by one or more system processes, which manage retrieving application metadata 705_3 for the subscriber making the invocation and executing the metadata as an application in a virtual machine.

Each application server 722 may be communicably coupled to database systems, e.g., having access to system data 707 and tenant data 705, via a different network connection. For example, one application server 722₁ might be coupled via the network 718 (e.g., the Internet), another application server $722_{N-1}$ might be coupled via a direct network link, and another application server $722_N$ might be coupled by yet a different network connection. Transfer Control Protocol and Internet Protocol (TCP/IP) are typical protocols for communicating between application servers 722 and the database system. However, it will be apparent to one skilled in the art that other transport protocols may be used to optimize the system depending on the network interconnect used.

In certain embodiments, each application server 722 is configured to handle requests for any user associated with any organization that is a tenant. Because it is desirable to be able to add and remove application servers from the server pool at any time for any reason, there is preferably no server affinity for a user and/or organization to a specific application server 722. In one embodiment, therefore, an interface system implementing a load balancing function (e.g., an F5 Big-IP load balancer) is communicably coupled between the application servers 722 and the user systems 720 to distribute requests to the application servers 722. In one embodiment, the load balancer uses a least connections algorithm to route user requests to the application servers 722. Other examples of load balancing algorithms, such as round robin and observed response time, also can be used. For example, in certain embodiments, three consecutive requests from the same user may hit three different application servers 722, and three requests from different users may hit the same application server 722. In this manner, system 702 is multi-tenant, in which system 702 handles storage of, and access to, different objects, data and applications across disparate users and organizations.

As an example of storage, one tenant might be a company that employs a sales force where each salesperson uses system 702 to manage their sales process. Thus, a user might maintain contact data, leads data, customer follow-up data, performance data, goals and progress data, etc., all applicable to that user's personal sales process (e.g., in tenant data storage 704). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 702 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 702 might also maintain system level data usable by multiple tenants or other data. Such system level data might include industry reports, news, postings, and the like that are sharable among tenants.

In certain embodiments, user systems 720 (which may be client systems) communicate with application servers 722 to request and update system-level and tenant-level data from system 702 that may require sending one or more queries to tenant data storage 704 and/or system data storage 706. System 702 (e.g., an application server 722 in system 702) automatically generates one or more SQL statements (e.g., one or more SQL queries) that are designed to access the desired information. System data storage 706 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of a user device (such as user device 180 in FIG. 1) or an organization's representative, such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com, Salesforce1®, Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Figure 8:
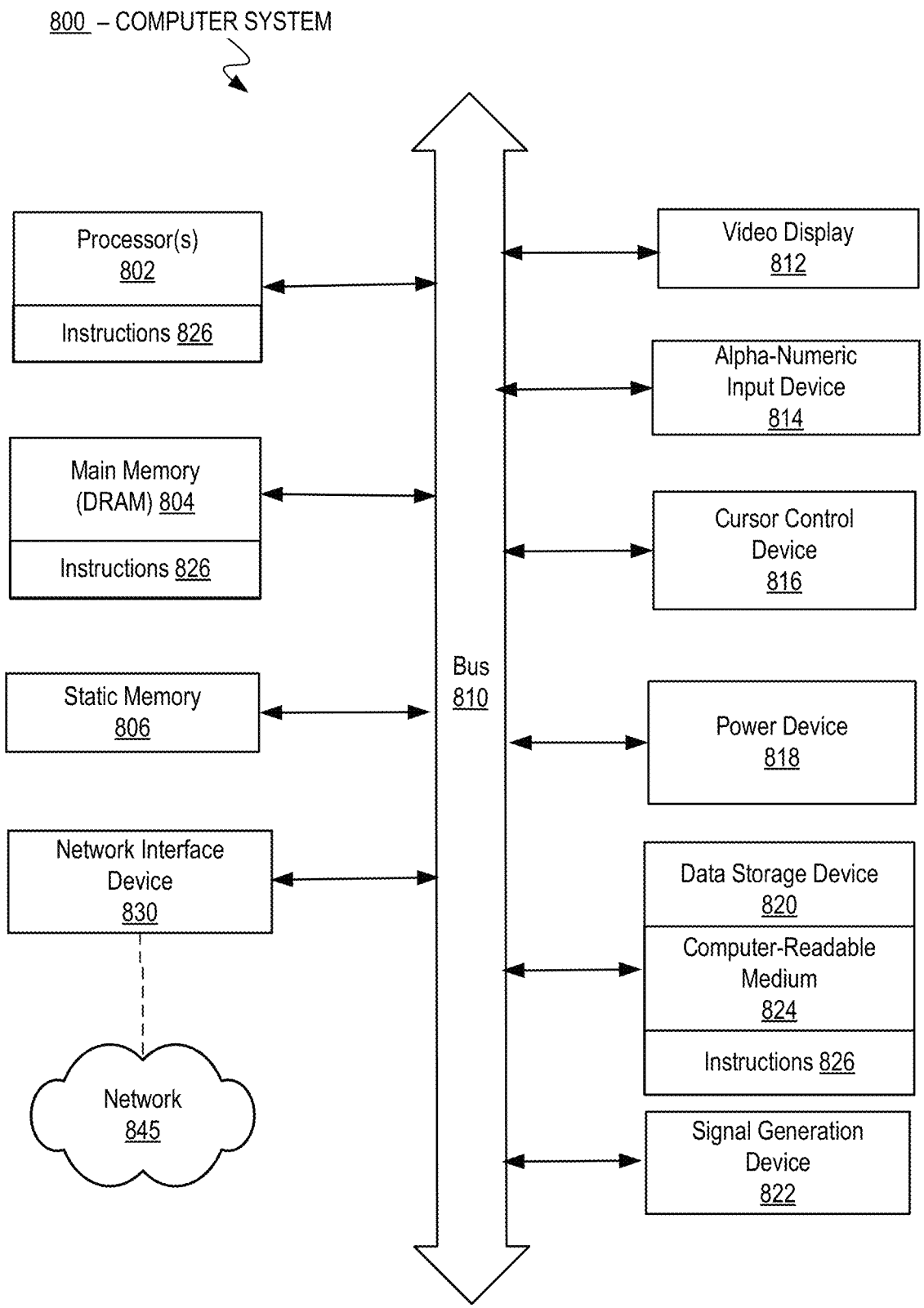
FIG. 8 is a block diagram illustrating a machine in the exemplary form of a general computer system within which one or more implementations of a configurable transaction status interface of an enterprise computing platform can be carried out.

FIG. 8 illustrates a diagrammatic representation of a machine in the exemplary form of a computer system 800 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 800 may be utilized by or illustrative of any of the electronic components described herein (e.g., any of the components illustrated in or described with respect to FIGS. 1, 2, 3 and 7A-7B).

The exemplary computer system 800 includes a processing device (processor) 802, a main memory 804 (e.g., ROM, flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 820, which communicate with each other via a bus 810.

Processor 802 represents one or more general-purpose processing devices such as a microprocessor, central processing unit, or the like. More particularly, processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute instructions 826 for performing the operations and steps discussed herein. Processor 802 may have one or more processing cores.

Computer system 800 may further include a network interface device 830. Computer system 800 also may include a video display unit 812 (e.g., a liquid crystal display (LCD), a cathode ray tube (CRT), or a touch screen), an alphanumeric input device 814 (e.g., a keyboard), a cursor control device 816 (e.g., a mouse or touch screen), and a signal generation device 822 (e.g., a loud speaker).

Power device 818 may monitor a power level of a battery used to power computer system 800 or one or more of its components. Power device 818 may provide one or more interfaces to provide an indication of a power level, a time window remaining prior to shutdown of computer system 800 or one or more of its components, a power consumption rate, an indicator of whether computer system is utilizing an external power source or battery power, and other power related information. In some implementations, indications related to power device 818 may be accessible remotely (e.g., accessible to a remote back-up management module via a network connection). In some implementations, a battery utilized by power device 818 may be an uninterruptable power supply (UPS) local to or remote from computer system 800. In such implementations, power device 818 may provide information about a power level of the UPS.

Data storage device 820 may include a computer-readable storage medium 824 (e.g., a non-transitory computer-readable storage medium) on which is stored one or more sets of instructions 826 (e.g., software) embodying any one or more of the methodologies or functions described herein. Instructions 826 may also reside, completely or at least partially, within main memory 804 and/or within processor 802 during execution thereof by computer system 800, main memory 804, and processor 802 also constituting computer-readable storage media. Instructions 826 may further be transmitted or received over a network 845 via network interface device 830.

In one implementation, instructions 826 include instructions for performing any of the implementations described herein. While computer-readable storage medium 824 is shown in an exemplary implementation to be a single medium, it is to be understood that computer-readable storage medium 824 may include a single medium or multiple media (e.g., a centralized or distributed database, and/or associated caches and servers) that store the one or more sets of instructions.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter

What is claimed is:

1. A computer-implemented method for configuring a status of transaction processed in an enterprise computing platform comprising:
defining a status variable for a transaction in an application in an application namespace;
exposing an interface to enable a transaction entity, in a transaction namespace separate from the application namespace, to populate the status variable with a generic status representing a result of processing the transaction in the transaction namespace; and
accessing the status variable populated with the generic status in the application namespace, the generic status based on a map of generic statuses defined in the application namespace to transaction results defined in the transaction namespace.

2. The computer-implemented method of claim 1, wherein to populate the status variable with the generic status representing the result of processing the transaction in the transaction namespace includes a logic in the transaction namespace to:
select the generic status from the map of generic statuses; and
set the status variable to a selected generic status.

3. The computer-implemented method of claim 1, wherein the map of generic statuses to transaction results includes at least one transaction result mapped to the generic status, including a default transaction result.

4. The computer-implemented method of claim 1, wherein:
the transaction entity is one of a plurality of transaction entities and transaction namespaces of each of the plurality of transaction entities are separate from one another and the application namespace; and
the generic status is one of a set of predetermined statuses that cause the application to take a uniform action for all transaction results mapped to the generic status regardless of which transaction entity of the plurality of transaction entities processes the transaction.

5. The computer-implemented method of claim 1, wherein:
the application is a packaged application of a multi-tenant database system of the enterprise computing platform;
the transaction entity is a payment gateway providing payment services to the application; and
the transaction is a financial transaction processed by the payment gateway.

6. The computer-implemented method of claim 1, wherein:
the status variable is a metadata type variable globally accessible from both the application namespace and the transaction namespace; and
the transaction results defined in the transaction namespace are custom metadata types of the metadata type variable.

7. A system for a computing platform having a configurable transaction status interface comprising:
at least one processor capable of executing instructions in multiple namespaces of a computing platform;
a memory storing instructions to cause the processor to:
define a status variable for a transaction in an application in an application namespace;
expose an interface to enable a transaction entity, in a transaction namespace separate from the application namespace, to populate the status variable with a generic status representing a result of processing the transaction in the transaction namespace; and
access the status variable populated with the generic status in the application namespace, the generic status based on a map of generic statuses defined in the application namespace to transaction results defined in the transaction namespace.

8. The system of claim 7, wherein to populate the status variable with the generic status representing the result of processing the transaction in the transaction namespace includes a logic in the transaction namespace to:
select the generic status from the map of generic statuses; and
set the status variable to the selected generic status.

9. The system of claim 7, wherein the map of generic statuses to transaction results includes at least one transaction result mapped to the generic status, including a default transaction result.

10. The system of claim 7, wherein:
the transaction entity is one of a plurality of transaction entities and transaction namespaces of each of the plurality of transaction entities are separate from one another and the application namespace; and
the generic status is one of a set of predetermined statuses that cause the application to take a uniform action for all transaction results mapped to the generic status regardless of which transaction entity of the plurality of transaction entities processes the transaction.

11. The system of claim 7, wherein:
the application is a packaged application of a multi-tenant database system of the computing platform;
the transaction entity is a payment gateway providing payment services to the application; and
the transaction is a financial transaction processed by the payment gateway.

12. The system of claim 7, wherein:
the status variable is a metadata type variable globally accessible from both the application namespace and the transaction namespace; and
the transaction results defined in the transaction namespace are custom metadata types of the metadata type variable.

13. A tangible, non-transitory computer-readable storage medium having instructions encoded thereon which, when executed by a processing device, cause the processing device to:
define a status variable for a transaction in an application in an application namespace;
expose an interface to enable a transaction entity, in a transaction namespace separate from the application namespace, to populate the status variable with a generic status representing a result of processing the transaction in the transaction namespace; and
access the status variable populated with the generic status in the application namespace, the generic status based on a map of generic statuses defined in the application namespace to transaction results defined in the transaction namespace.

14. The tangible, non-transitory computer-readable storage medium of claim 13, wherein the instructions to populate the status variable with the generic status representing the result of processing the transaction in the transaction namespace includes instructions for execution in the transaction namespace to:
select the generic status from the map of generic statuses; and
set the status variable to a selected generic status.

15. The tangible, non-transitory computer-readable storage medium of claim 13, wherein the map of generic statuses to transaction results includes at least one transaction result mapped to the generic status, including a default transaction result.

16. The tangible, non-transitory computer-readable storage medium of claim 13, wherein:
the transaction entity is one of a plurality of transaction entities and transaction namespaces of each of the plurality of transaction entities are separate from one another and the application namespace; and
the generic status is one of a set of predetermined statuses that cause the application to take a uniform action for all transaction results mapped to the generic status regardless of which transaction entity of the plurality of transaction entities processes the transaction.

17. The tangible, non-transitory computer-readable storage medium of claim 13, wherein:
the application is a packaged application of a multi-tenant database system operating in the processing device;
the transaction entity is a payment gateway providing payment services to the application; and
the transaction is a financial transaction processed by the payment gateway.

18. The tangible, non-transitory computer-readable storage medium of claim 13, wherein:
the status variable is a metadata type variable globally accessible from both the application namespace and the transaction namespace; and
the transaction results defined in the transaction namespace are custom metadata types of the metadata type variable.

19. An apparatus for an enterprise computing platform comprising:
at least one processor configured to process instructions for an application in an application namespace and a gateway in a gateway namespace, the application namespace separate from the gateway namespace;
the at least one processor configured to process instructions for an interface between the application namespace and the gateway namespace, wherein the instructions for the interface cause the processor to:
define a status variable for a transaction processed in the application namespace and the gateway namespace;
populate the status variable with a generic status representing a result of the transaction processed in the gateway namespace; and
access the status variable populated with the generic status in the application namespace, the generic status based on a map of one or more generic statuses defined in the application namespace to one or more results for transactions processed in the gateway namespace, the one or more results defined in the gateway namespace.

20. The apparatus of claim 19, wherein to populate the status variable with the generic status representing the result of processing the transaction in the gateway namespace includes a logic in the gateway namespace to:
select the generic status from the map of the one or more generic statuses; and
set the status variable to a selected generic status.

21. The apparatus of claim 19, wherein the map of the one or more generic statuses to results includes at least one result mapped to the generic status, including a default result.

22. The apparatus of claim 19, wherein:
the gateway is one of a plurality of gateways, each gateway in a corresponding gateway namespace separate from other gateway namespaces; and
the generic status is one of a set of predetermined statuses that cause the application to take a uniform action in the application namespace for all results mapped to the generic status regardless of which gateway of the plurality of gateways processed the transaction.

23. The apparatus of claim 19, wherein:
the application is a packaged application of a multi-tenant database system of the enterprise computing platform;
the gateway is a payment gateway providing payment services to the application; and
the transaction is a financial transaction processed by the payment gateway.

24. The apparatus of claim 19, wherein:
the status variable is a metadata type variable globally accessible from both the application namespace and the gateway namespace; and
the transaction results defined in the gateway namespace are custom metadata types of the metadata type variable.

* * * * *